D. M. WOODIN.
Churn.

No. 28,528.

Patented May 29, 1860.

Witnesses
C. M. Alexander
A. Yeatman

Inventor
D M Woodin

UNITED STATES PATENT OFFICE.

D. M. WOODIN, OF BRANDON, WISCONSIN.

CHURN.

Specification of Letters Patent No. 28,528, dated May 29, 1860.

*To all whom it may concern:*

Be it known that I, D. M. Woodin, of Brandon, in the county of Fond du Lac and State of Wisconsin, have invented certain new and useful Improvements in Churns; and I do hereby declare that the following is a full, clear, and exact description of the same, reference being had to the accompanying drawings, and to the letters of reference marked thereon.

The nature of my invention consists in constructing and arranging the churn dashers substantially in the manner hereinafter set forth.

Figure 2:
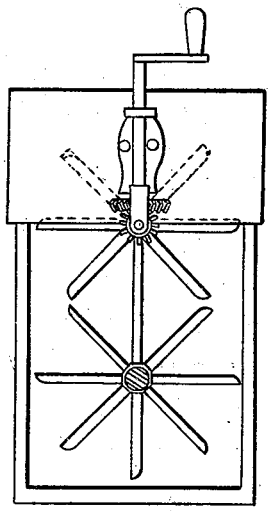
Figure 1:
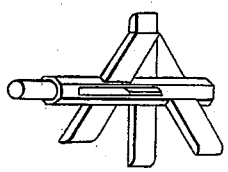
Figure 1:
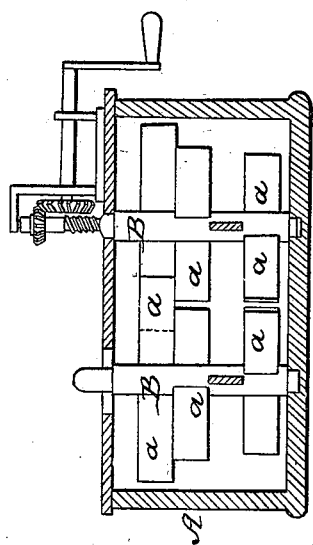

In the drawings Figure 1 is a side view with one side removed. Fig. 2 is a plan view. Fig. 3 is a perspective of one of the dashers.

In the figures A, represents the churn box, which may be made of any suitable size, and in any of the ordinary ways. Within this box are placed two dashers or wheels, B, B, which consist of shafts provided with a series of arms a, a, a. The arms a, a, a, are secured to the shafts in a spiral form, or screw shape, so that when, placed in such a position that they interlap with each other, they revolve together—the one being revolved by the other like spiral gearing. It is necessary that the gearing on the outside or top of the box, should, connect with one, with only one of the shafts, for by revolving it, the other is revolved at the same time by the arms coming in contact with each other.

These two spiral wheels revolving in this way force the cream downward all the while, but it rising again on the outside of the wheels, is kept moving in a constant current from top to bottom, and from bottom to top. In addition to the friction thus caused and the moving of the cream in a constant current, the arms overlapping and interlapping mash the globules of the cream as they meet and press against each other. The arms meet at an angle, and the angle is closed until the arms come flatly together, thus catching and breaking the globules, between the arms as they revolve the wheels. This arrangement is extremely simple cheap and effective, and possesses almost all of the advantages, of churns of complicated and expensive construction.

Having thus fully described my invention what I claim as new and desire to secure by Letters Patent is—

So arranging the two dasher shafts which are provided with wings secured to them in a screw or spiral form, that by revolving one the other will be revolved by it, the wings interlapping, pressing against each other, and expressing the butter from the cream as the bearings of the wings change from bottom to top or vice versa, substantially as specified.

D. M. WOODIN.

Witnesses:
E. W. Allen,
M. A. Showers.